US011350795B2

(12) United States Patent
Giusti

(10) Patent No.: US 11,350,795 B2
(45) Date of Patent: Jun. 7, 2022

(54) FOOD DELIVERY SYSTEM

(71) Applicant: Chef Pack, LLC, Lake in the Hills, IL (US)

(72) Inventor: Stefano Giusti, Viterbo (IT)

(73) Assignee: CHEF PACK, LLC, Lake in the Hills, IL (US)

( * ) Notice: Subject to any disclaimer, the term of this patent is extended or adjusted under 35 U.S.C. 154(b) by 0 days.

(21) Appl. No.: 16/364,307

(22) Filed: Mar. 26, 2019

(65) Prior Publication Data

US 2020/0305648 A1 Oct. 1, 2020

(51) Int. Cl.
| | |
|---|---|
| *A47J 47/14* | (2006.01) |
| *A45C 13/02* | (2006.01) |
| *A47G 23/04* | (2006.01) |
| *B65D 81/34* | (2006.01) |
| *B65D 81/38* | (2006.01) |
| *B65D 25/04* | (2006.01) |
| *B65D 25/28* | (2006.01) |

(52) U.S. Cl.
CPC .............. *A47J 47/14* (2013.01); *A45C 13/02* (2013.01); *A47G 23/04* (2013.01); *B65D 81/3476* (2013.01); *B65D 81/3825* (2013.01); *B65D 25/04* (2013.01); *B65D 25/2873* (2013.01); *B65D 2577/042* (2013.01)

(58) Field of Classification Search
CPC ........ B65D 2577/042; B65D 2588/743; B65D 2588/746; B65D 88/745; B65D 88/744; B65D 88/74; A47J 47/145; A45C 11/02
See application file for complete search history.

(56) References Cited

U.S. PATENT DOCUMENTS

| | | | | |
|---|---|---|---|---|
| 6,191,401 B1 * | 2/2001 | Salerno | .................... | A47J 47/14 126/246 |
| 6,670,585 B2 * | 12/2003 | Burkett | ................. | A47J 39/003 137/409 |

(Continued)

FOREIGN PATENT DOCUMENTS

| | | | | |
|---|---|---|---|---|
| CN | 100498124 C | * | 6/2009 | .......... F25D 31/005 |
| WO | 2005096869 A1 | | 10/2005 | |

(Continued)

OTHER PUBLICATIONS

European Search Report and Written Opinion for Corresponding EP Application No. 20165656.8. (5 Pages) (May 5, 2020).

*Primary Examiner* — Jianying C Atkisson
*Assistant Examiner* — Meraj A Shaikh
(74) *Attorney, Agent, or Firm* — Lucas & Mercanti, LLP

(57) ABSTRACT

A food delivery system configured for transportation of a food product from a production site to a consumer site is disclosed having a chamber configured for housing a packaged ready-to-eat meal. The chamber defines an internal environment wherein the food product is received. The system also includes environmental temperature and humidity sensors associated with the chamber, one or more conditioning devices, associated with the chamber in such a way to condition one or more parameters of said internal environment, and a control unit, configured so that the parameters of the internal environment are continuously and adaptively adjusted so as to preserve the food product between the production site and the consumer site.

12 Claims, 2 Drawing Sheets

(56) References Cited

U.S. PATENT DOCUMENTS

| | | | |
|---|---|---|---|
| 2005/0028543 A1* | 2/2005 | Whitehead | F25D 15/00 |
| | | | 62/237 |
| 2007/0235179 A1* | 10/2007 | Phillips | F24F 5/0046 |
| | | | 165/244 |
| 2008/0023459 A1* | 1/2008 | Leach | B60P 3/36 |
| | | | 219/202 |
| 2016/0058181 A1* | 3/2016 | Han | A47B 71/00 |
| | | | 312/236 |
| 2016/0300187 A1* | 10/2016 | Kashi | G06Q 10/0836 |
| 2017/0259648 A1 | 9/2017 | Putcha et al. | |
| 2017/0265687 A1 | 9/2017 | Veltrop et al. | |
| 2018/0249735 A1* | 9/2018 | Espinosa | A23L 3/003 |
| 2019/0261638 A1* | 8/2019 | Jin | A23B 7/148 |

FOREIGN PATENT DOCUMENTS

| | | |
|---|---|---|
| WO | 2017173138 A1 | 10/2017 |
| WO | 2017205431 A1 | 11/2017 |

\* cited by examiner

FOOD DELIVERY SYSTEM

FIELD OF THE INVENTION

The present invention relates to a food delivery system defining a confined environment for hosting food during the delivery thereof from a production site to a consumer site. More particularly, the food delivery system comprises, or consists of, a food delivery container such as a bag or backpack.

BACKGROUND OF THE INVENTION

In the field of food delivery, as in many other sectors, the rise of digital technology is reshaping the market. Consumers who are used to shopping online through apps or websites, with maximum convenience and transparency, increasingly expect the same experience when it comes to ordering meals. In this framework, the business of supplying restaurant meals at home is rapidly changing as new online platforms compete to conquer markets and customers. Such online food distribution platforms are expanding choice and practicality, allowing customers to order from a wide range of restaurants by a simple touch of their smart phone or tablet.

Companies that deal with this sector build their own logistics networks, providing delivery to restaurants that do not have their own drivers and allow consumers to compare offers and order meals from a group of restaurants through a single website or app, wherein customer satisfaction can also be constantly monitored.

While the specific features, cost and efficiency of the service offered by each platform are part of the organizational model chosen by each operator, the actual quality of the food product delivered—and perceived—by the consumer/customer strongly depends upon the characteristics of the specific transportation tools the company has equipped itself with.

The technical solutions commonly adopted to ship takeaway food essentially consist of containers in direct contact with the product, such as cardboard pizza boxes, often transported into a sealed or thermally-insulated compartment.

However, the transportation means currently available do not allow to preserve properly the organoleptic properties of the delivered food during the journey between the point of production and place of consumption.

These inconveniences become more important with the enlargement of the geographical area to be served and longer duration of the journey. In practice, when more than fifteen minutes elapse between the time the dish is prepared and the time it is delivered, the taste, fragrance and consistency of the food tend to be strongly affected, to an extent that is perceived by the final customer/consumer.

In other words, the delivery containers and tools available on the market appear inadequate to the increased dynamism of the service and the increasing demand from the consumers to receive high quality food products.

SUMMARY OF THE INVENTION

The technical problem underlying the present invention is therefore to overcome the drawbacks mentioned above with reference to the state of the art.

The above problem is solved by a food delivery system according to the invention described herein.

The system of the present invention defines an inner environment with controlled environmental parameters, which allows to continuously and adaptively preserve the food product all the way between the point of withdrawal by the logistics company and the point of delivery.

In a preferred embodiment, the system comprises one or more compartments, or chambers, physically and thermally insulated from each other in which to place respective hot and/or cold, eventually packaged, food products. Each chamber may define a respective inner environment as introduced above.

In specific implementations, the volume of each chamber may be comprised in a range of about 4.5-700 liters (4,500-700,000 $cm^3$).

Each chamber, or environment, may be equipped with one or more sensors or transducers that detect environmental parameters, in particular internal humidity and/or temperature, so as to be able to monitor the conditions in which the food product is hosted during transportation. Such sensors can include, for example, thermocouples and/or hygrometers.

The sensor(s) can be connected to a resident or remote control unit, e.g. to a computing centre, configured for analysing/processing the data collected by the sensor(s). Such control unit may be configured to operate on the basis of a calculation scheme, e.g. by comparison with pre-set parameters or by applying an artificial intelligence (AI)-type decision processing.

The control unit, on the basis of the results of the above elaborations, can coordinate and/or command the activation and adjustment of environment conditioning devices, for example heating and/or cooling devices and/or air/humidity extraction/inletting devices. For example, the control unit may determine the turning on and off of said devices and/or adjust their current operating parameters.

In this way, optimal/desired environmental conditions can be maintained within each chamber, in particular levels of optimal humidity and temperature for preserving the food products received therein.

The aforementioned heating devices may include, e.g., heating elements, for example electrical resistors. Such elements may be contained or incorporated in substrates or enclosed between layers having good thermal conductivity or capable of distributing the heat generated in a safe and uniform manner, preferably also with fireproof and protective properties. Such substrates or layers may be made of, or include, silicone.

The heating devices may also include heating surfaces, for example arranged at a support basis of the, or each, chamber. Such heating surfaces may be based upon electromagnetic induction technology, e.g. including an electromagnetic induction plate.

As it is known in the art, this type of plates generally consists of a contact surface transparent to the magnetic fields and includes one or more electromagnets located below this surface, so that the electromagnet(s) transfers heat through magnetic excitation of molecules sensitive to this form of energy (made, e.g., of one or more among iron, iron powder, iron oxide/$Fe_2O_3$, magnetite/hydroxide $Fe_3O_4$, steel in foil, nickel, and the like). Such molecules may be located onto a dedicated element, eventually incorporated, printed or laminated in/on a primary packaging of the food product.

Preferably, particularly when an induction plate is used, the device may be configured to heat selectively specific areas of the food product, or of a primary packaging containing the food product. Such areas may be pre-defined, recognized by dedicated means of the heating device and/or identified based upon the information about the food product and the optimal environmental conditions to be maintained, e.g. as stored in the control unit.

The aforementioned extraction devices can include mechanical elements—e.g. fans, pumps, and the like, as well as associated pipes and systems well known to a person skilled in the art—for example capable of generating a depression inside the chamber such as to extract the air charged with water vapor from inside the chamber and direct it towards the outside. In some embodiments, the extracted air is directed to re-conditioning devices of said air. For example, the extraction devices can be in (selective) communication with air drying elements capable of removing part or all of the $H_2O$ (wet) component from the extracted air. Thereafter, the dried air can be re-injected into the chamber, optimizing the total energy consumption and the use of the heating device.

The drying elements can include additional rooms or auxiliary chambers, appendages or filters. In some embodiments, the drying elements are equipped with chemical compounds (e.g. crystals and silica gels, bentonite, and the like) capable of retaining the water molecules contained in the airflow extracted from the system inner environment(s).

After the drying phase, the dry air can be reintroduced into the chamber(s) or environment(s) of the system through inletting devices, e.g. configured to establish a pneumatic prevalence and capable of creating positive pressure inside the chamber(s) or environment(s).

The air to be inlet can be conditioned in temperature, e.g. by a further heating/cooling device arranged outside the chamber(s) or environment(s), so that air is entered at a temperature such as not to compromise the internal conditions of the inner environment(s).

The energy required for the whole system can be provided in various ways, for example by one or more of the following:

portable batteries (e.g. lithium-ion, alkaline, lead-acid, and the like);

connection, e.g. via a 12V socket, to a charging socket, e.g. of a delivery vehicle, the vehicle being, e.g., a motorvehicle or a bicycle equipped to supply the necessary power (e.g. by batteries, motors, generators, dynamo, and the like);

solar panels, wind turbines and any other form of alternative energy production capable of supplying the energy needed, e.g. associated with a delivery vehicle and eventually a dedicated connection socket.

According to a preferred embodiment, the control unit is configured to transmit data acquired by the sensors/transducers and/or processed by the unit to a remote server or storing system, e.g. a cloud server. Preferably, a wireless mode is used, e.g. through a WiFi or SIM module.

A storing facility may be included (also) in the control unit.

Advantageously, the (remote) storing system may be configured to make the data available to multiple subjects and/or devices for:

monitoring the delivery phase and maintaining the so-called "value chain".

This value chain may be monitored also through the implementation of one or more sensors/transducers detecting any access/opening of the system chambers. Such sensors/transducers may be connected, e.g. via cloud server, to a centralized machine that issues unique codes, e.g. of the blockchain type (BaaS—Blockchain as a Service), at every chamber opening/closing. In this way, the delivery process is inextricably linked to a data record that cannot be hacked by any individual or malware and therefore it is impossible to tamper with the delivery or alter its content without any trace of it remaining.

This tracking system potentially fills an enormous regulatory and technological gap in the market of ready-to-eat food described above. In fact, there are many rules and laws that regulate the production and supply of food, both in organized distribution and retail as well as in restaurants, but such regulatory framework does not exist as well in the growing home delivery industry. In this latter field, food is entrusted to companies and third-party operators other than those who have handled and made the dish and who do not have methods (so-called tamper-evident) in the field for the prevention or detection of tampering, alterations, sophistication and contamination of the products entrusted to them in any way.

In a most preferred embodiment, the food delivery system of the present invention preferably includes, or is in the form of, a container. The latter may not be in direct contact with the food product, hosting a primary packaging of the product itself.

The food delivery system of the present invention may also include a plurality of containers, fixedly or removably connected to each other or to a common supporting structure. In case of multiple containers, preferably they are thermally insulated with respect to one another, for example using thermally stable and insulating materials (e.g. airgel, glass wool, and the like) so as to avoid interference and heat loss between them.

Similarly, a same container may provide multiple chambers, advantageously thermally insulated with respect to one another as discussed above.

The aforementioned environment(s), container(s) and/or chamber(s) can be incorporated into any means of transport or manual delivery, such as:

motor-vehicles, also of the hybrid type or driven by electric engines;

self-driving vehicles;

bicycles and electric bicycles;

drones;

robots according to a most preferred embodiment, bags, including backpacks.

In particular, as mentioned above, the food delivery system according to the present invention can be a standalone unit or be incorporated, as an integral or detachable part, into a bag, backpack, vehicle or delivery system of any kind.

Still as mentioned above, according to most preferred embodiments, the system is configured for hosting ready-to-eat food products, either alone or packaged in a primary packaging.

The food products may be any type of beverages or catering products.

Other advantages, features and use modes of the present invention will result evident from the following detailed description of some embodiments, provided by way of example and not with limitative purpose.

BRIEF DESCRIPTION OF THE DRAWINGS

Reference will be made to the figures of the annexed drawings, wherein.

DETAILED DESCRIPTION OF PREFERRED EMBODIMENTS

Figure 1:
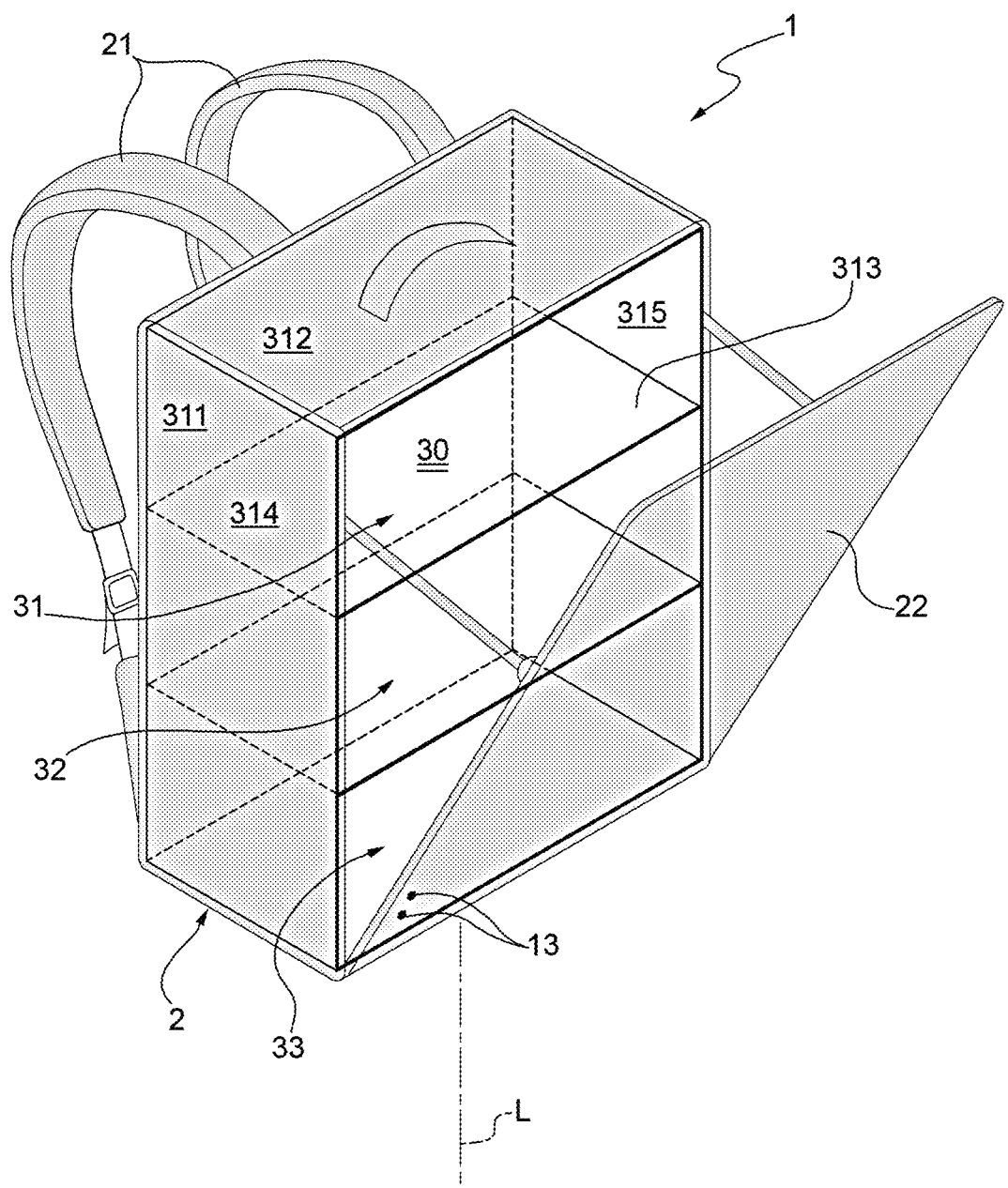
FIG. 1 shows a perspective view, partially illustrating the internal parts, of a delivery device in form of a backpack according to a preferred embodiment of the present invention.

With initial reference to FIG. 1, a food delivery system according to an embodiment of the present invention is in form of a backpack denoted globally by 1.

Backpack 1 is configured for transportation of a food product, in particular a ready-to-eat meal, from a production site to a consumer site.

Backpack 1 comprises a supporting structure 2, mainly represented in dark tone in FIG. 1, with braces 21 for being worn on a courier's shoulders. Supporting structure 2 also includes a front openable door, or wall, 22 which allows access to the interior of the backpack itself.

In the present example, backpack 1 includes three chambers, denoted by 31, 32 and 33, respectively, in particular arranged vertically stacked one above the other along a longitudinal direction L of development of backpack 1. Each chamber 31, 32, 33 is defined by respective back, upper, bottom and lateral sidewalls of supporting structure 2 and frontally closed by a respective portion of front openable wall 22. In an exemplificative way, the sidewalls delimiting first chamber 31 are denoted by 311 for the back sidewall, 312 for the upper sidewall, 313 for the bottom sidewall, or septum, and 314 and 315, respectively, for the two lateral sidewalls.

Advantageously, chambers 31-33 are thermally isolated with respect to one another and with respect to the external by way of said sidewalls or septa.

In the following, only chamber 31 will be described in detail. It is intended that the same description may apply also to each of the other two chambers 32 and 33.

As mentioned above, chamber 31 is configured for housing a food product, e.g. a pasta dish, either per se or received in a primary packaging, the later made, e.g., of cardboard.

Chamber 31 defines an internal environment 30 wherein the food product is received.

Figure 2:
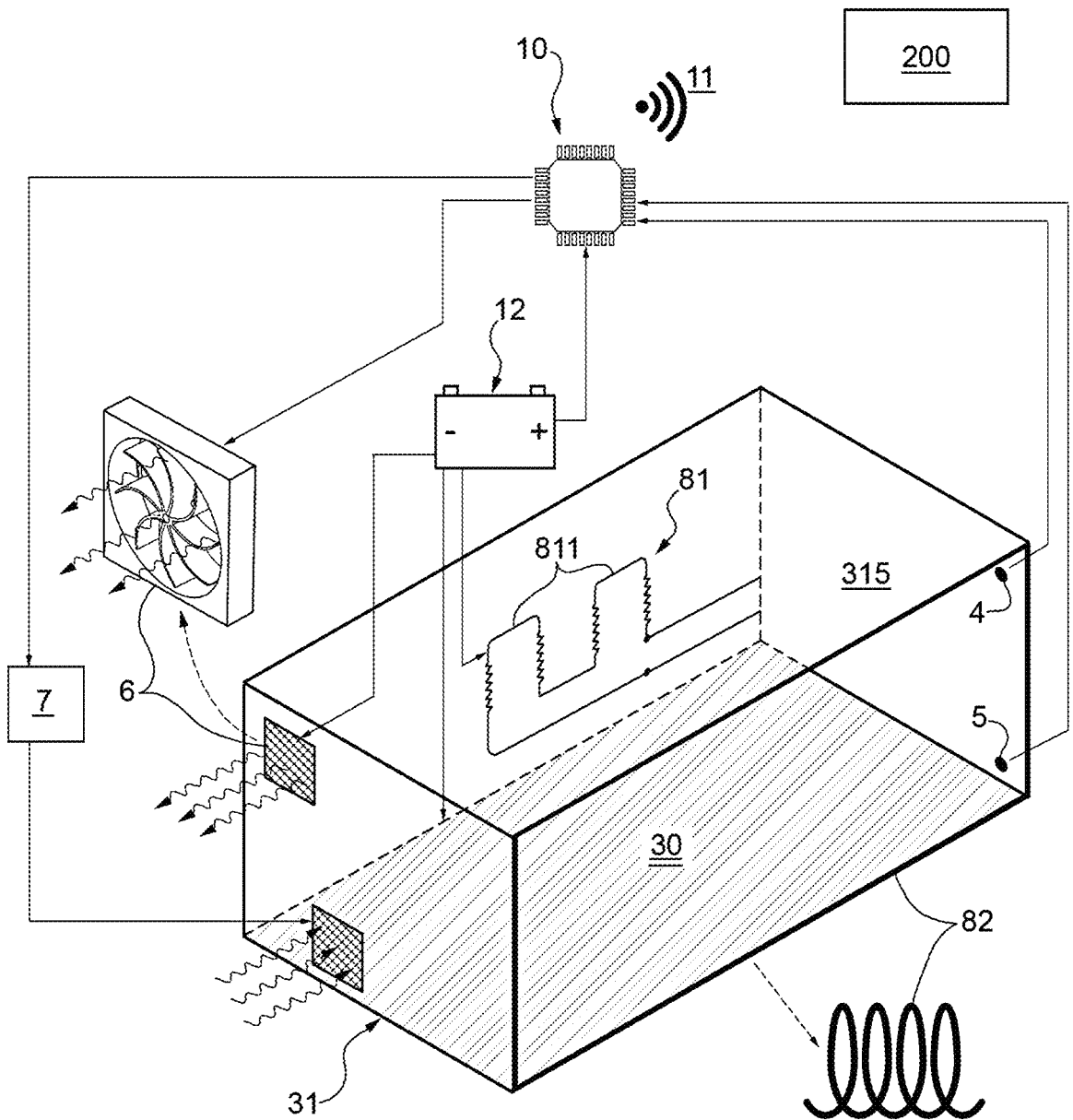
FIG. 2 shows a schematic enlarged view, partially exploded and partially in form of a block diagram, of an internal chamber of the delivery device of FIG. 1.

As shown in FIG. 2, at or inside chamber 31, for example at one or more of its sidewalls or in communication with the chamber interior, there are arranged detecting elements, e.g. sensors or transducers, configured to detect a parameter of internal environment 30, for example humidity, temperature, pressure, presence of specific volatile substances or other. In the present example, a temperature sensor 4, e.g. a thermocouple, and a humidity sensor, e.g. a hygrometer, are represented as associated with lateral sidewall 315.

The parameters of internal environment 30 can be conditioned, i.e. varied or adjusted, by one or more conditioning devices operating to change, i.e. condition, said parameters.

In the present example, there is provided a ventilation device 6, e.g. comprising a fan, configured to extract air with a certain humidity, i.e. water vapour content, from the internal environment 30. The same device, or a different one, can be used to re-introduce (drier) air into environment 30.

Dryer air inlet into environment 30 can be sucked from the exterior of backpack 1 or it can be the same—or substantially the same-air extracted from environment 30 which has been treated in an air drying device, or also a mixing of said two flows.

Said air drying device, denoted by 7 in FIG. 2, may be located along a pneumatic circuit determining said outflow and inflow from/into the internal environment 30.

In the present embodiment, backpack 1 comprises also another conditioning device, being a heating device denoted by 81. Heating device 81 comprises one or more electric resistors 811, for example incorporated in back sidewalls 312 of chamber 31.

As an alternative or an additional heating device, backpack 1 may also comprise an electromagnetic induction device including an electromagnetic induction plate 82, preferably associated with, or incorporated, into bottom sidewall 313.

In the present example, backpack 1 also includes an on-board power supply 12.

Backpack 1 comprises a control unit 10 shown as a microprocessor (10) in FIG. 2), in communication with sensors 4 and 5 and with devices 6, 7 and 81/82. In particular, control unit 10 is configured for receiving signals indicative of the detected parameters and for commanding the conditioning devices in such a way that the parameters of internal environment 30 are continuously and adaptively adjusted so as to preserve the food product between the production site and the consumer site. Said control and adjustment can follow pre-selected threshold or patterns or be determined according to adaptive algorithms.

Communication between control unit 10 and the other components of system 1 can occur via wireless data transmission 11.

Backpack 1 can additionally be configured for transmitting signals indicative of the detected parameters, or of data elaborated by control unit 10, to a remote database or server 200. To this aim, system 1 can include a (additional) data transmission device, possibly incorporated into control unit 10.

In some embodiments, backpack 1 additionally comprises opening/closing detecting elements, in particular sensors or transducers, configured to detect opening and/or closing of chamber 31 and preferably in communication with control unit 10. Such additional detecting elements are denoted by 13 in FIG. 1 and shown as associated with front door 22.

Signals associated with said opening/closing can be also transmitted to a remote provider, which may be the same server 200 or a different database or provider held by third parties with respect to the food delivery company. Said provider may be configured to generate univocal tracking codes to each opening or closing of the backpack 1.

Variant embodiments may provide for an individual, dedicated access wall or door for each chamber or environment. In this case, individual tracking of access to individual chambers or environments may be implemented.

The present invention has presented preferred embodiments. It is intended that there may be other embodiments which refer to the same inventive concept as defined by the scope of the following claims.

The invention claimed is:

1. A food delivery system, configured for transportation of a food product from a production site to a consumer site, which food delivery system comprises:
   a chamber, which defines an internal environment wherein the food product is received;
   one or more detecting elements associated with said chamber and configured to detect one or more parameters of said internal environment, said one or more parameters including levels of optimal humidity;
   one or more conditioning devices, associated with said chamber in such a way to condition one or more parameters of said internal environment, wherein said one or more conditioning devices comprise a ventilation device configured to extract air, as measured by said one or more detecting elements for levels of optimal humidity, from said internal environment and a device configured to re-introduce into said internal environment drier air with a humidity less than the humidity of the extracted air thereby maintaining levels of optimal humidity for the food product in said internal environment; and a controller in communication with said one or more detecting elements and configured to receive therefrom signals indicative of detected parameters and configured to command said one or more conditioning devices;

wherein the controller is further configured to continuously monitor the one or more parameters, including levels of optimal humidity, of said internal environment and further configured to adaptively adjust the one or more parameters, including levels of optimal humidity, so as to preserve the food product between the production site and the consumer site; and wherein the food delivery system comprises a bag with chambers physically and thermally insulated from each other.

2. The food delivery system according to claim 1, wherein said one or more detecting elements comprise one or more sensors or transducers.

3. The food delivery system according to claim 1, wherein said one or more parameters of said internal environment comprise temperature.

4. The food delivery system according to claim 1, wherein said one or more conditioning devices include one or more of the following: air inletting devices, air extraction devices, air heating devices, air drying devices, air cooling devices.

5. The food delivery system according to claim 1, wherein said one or more conditioning devices comprise a heating device having an electromagnetic induction plate.

6. The food delivery system according to claim 1, wherein said one or more conditioning devices comprise a heating device having one or more electric resistors producing heat by Joule effect.

7. The food delivery system according to claim 1, wherein said one or more conditioning devices comprise an air drying device arranged outside said internal environment and configured to reduce the humidity content of a flow of air to be introduced in said internal environment.

8. The food delivery system according to claim 1, additionally comprising an on-board power supply or means for connection to an external power supply.

9. The food delivery system according to claim 1, additionally comprising a data transmission device configured for transmitting signals indicative of said one or more parameters to a remote database or server.

10. The food delivery system according to claim 1, additionally comprising: opening/closing detecting elements, configured to detect opening or closing of said chamber; and a data transmission device configured to transmit signals provided by said opening/closing detecting elements to a remote provider, said provider being configured to generate univocal tracking codes associated with each opening or closing of said chamber.

11. The food delivery system according to claim 1, wherein the bag comprises a backpack.

12. The food delivery system according to claim 1, wherein the controller comprises a microprocessor.

* * * * *